United States Patent
Hosn et al.

(10) Patent No.: US 10,367,747 B2
(45) Date of Patent: Jul. 30, 2019

(54) FLOW CONTROLLER AUTOMATICALLY THROTTLING RATE OF SERVICE PROVIDED BY WEB API

(71) Applicant: International Business Machines Corporation, Armonk, NY (US)

(72) Inventors: Rafah A. Hosn, New York, NY (US); Carl P. Zetie, Waterford, VA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/209,969

(22) Filed: Jul. 14, 2016

(65) Prior Publication Data
US 2018/0019950 A1 Jan. 18, 2018

(51) Int. Cl.
*H04L 12/825* (2013.01)
*H04L 12/801* (2013.01)
*H04L 12/875* (2013.01)
*H04L 12/815* (2013.01)

(52) U.S. Cl.
CPC .............. *H04L 47/25* (2013.01); *H04L 47/19* (2013.01); *H04L 47/22* (2013.01); *H04L 47/564* (2013.01)

(58) Field of Classification Search
CPC combination set(s) only.
See application file for complete search history.

(56) References Cited

U.S. PATENT DOCUMENTS

| | | | |
|---|---|---|---|
| 7,895,353 B2 | 2/2011 | Jansson | |
| 8,370,395 B1 * | 2/2013 | Gupta | G06F 17/3089 707/799 |
| 8,634,335 B1 | 1/2014 | Kondapalli | |
| 8,671,385 B2 | 3/2014 | Byrd et al. | |
| 8,788,695 B2 | 7/2014 | Fox et al. | |
| 8,863,266 B1 | 10/2014 | Sanyal et al. | |
| 8,959,237 B2 | 2/2015 | Lin et al. | |
| 2008/0162664 A1 | 7/2008 | Jegadeesan | |
| 2013/0086258 A1 | 4/2013 | Kalgi et al. | |
| 2013/0223602 A1 * | 8/2013 | Watts | H04L 51/36 379/100.01 |
| 2014/0063027 A1 * | 3/2014 | Becker | G06F 13/14 345/520 |

OTHER PUBLICATIONS

"Leaky bucket", Wikipedia, https://en.wikipedia.org/wiki/Leaky_bucket, last modified Jun. 6, 2016, downloaded from the Internet Jul. 14, 2016, 12 pages.

(Continued)

*Primary Examiner* — Yee F Lam

(74) *Attorney, Agent, or Firm* — Stephen R. Tkacs; Stephen J. Walder, Jr.; Robert M. Sullivan

(57) ABSTRACT

A mechanism is provided in a data processing system for automatically throttling the rate of service provided by a Web application programming interface (API) for a software service. A flow controller executing on the data processing system assigns a queue to each consumer of the software service. Responsive to receiving a current request for the software service from a given consumer of the software service, a flow controller executing on the data processing system adds the current request to a given queue assigned to the given consumer. The flow controller sends a next request from the given queue to the Web API based on a licensed rate of service of the given consumer.

20 Claims, 3 Drawing Sheets

(56) References Cited

OTHER PUBLICATIONS

Nasim, Faisal et al., "Live Traffic Bifurcation for Backward Compatibility", Microsoft, www.ip.com, IPCOM000171150D, Technical Disclosure, May 30, 2008, 10 pages.

Welsh, Matt et al., "Adaptive Overload Control for Busy Internet Servers", 4th USENIX Symposium on Internet Technologies and Systems (USENIX'03), Seattle, Washington, Mar. 26-28, 2003, 14 pages.

\* cited by examiner

FLOW CONTROLLER AUTOMATICALLY THROTTLING RATE OF SERVICE PROVIDED BY WEB API

BACKGROUND

The present application relates generally to an improved data processing apparatus and method and more specifically to mechanisms for automatically throttling the rate of service provided by a Web application programming interface.

An application programming interface (API) is an interface published by a software service (provider) that is available to other software applications (consumers) to exploit. In response to a call from the consumer, the provider performs a service or returns information. In particular, a Web API is an API that is made available between a provider and a consumer over Web transport technologies, such as Hypertext Transport Protocol (HTTP) or HTTP secure (HTTPS). Numerous technical implementations of APIs are possible. Examples include Simple Object Access Protocol (SOAP) and Representational State Transfer (REST).

APIs offer a way for separately developed software capabilities to integrate, even when the capabilities run on separate machines or even across the network. The use of APIs as the means to assemble a business process from existing parts is now the market's normal expectation. For example, a Web map service API allows another application to request driving time and distance between two endpoints by sending a request to the Web API service and receiving back a packet of information containing the requested information.

An API may be published openly for public consumption, or it may be restricted only to defined consumers by prior contractual arrangement, for example by purchasing a subscription to the service.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatically throttling the rate of service provided by a Web application programming interface (API) for a software service. The method comprises assigning, by a flow controller executing on the data processing system, a queue to each consumer of the software service. The method further comprises adding, by the flow controller, the current request to a given queue assigned to the given consumer responsive to receiving the current request for the software service from the given consumer of the software service. The method further comprises sending, by the flow controller, a next request from the given queue to the Web API based on a licensed rate of service of the given consumer.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
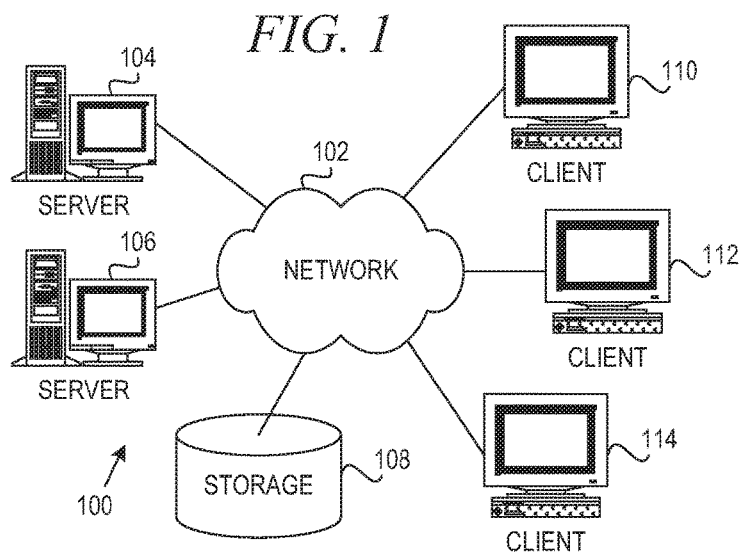
FIG. 1 is an example diagram of a distributed data processing system in which aspects of the illustrative embodiments may be implemented.

An API service can respond to requests only at a finite rate. The service will typically be shared by multiple consumers; therefore, if one consumer uses the service excessively, others may suffer slower response times. At times of peak demand, the total demand may exceed the capacity of the API service; therefore, the rate of service to each consumer must be rationed or throttled in some way. The rate of service may also be limited by the contract or subscription between the provider and the consumer, allowing the provider to limit the usage by any one client and to charge higher prices for higher rates of service.

Existing solutions throttle demand by rejecting requests, returning an error status, that exceed the rate permitted by the contract or the provider's capacity to provide service. Each consumer must implement error-handling code, which might be different for each service consumed. Each consumer must compute an appropriate wait time before retrying. If the permitted rate is based on a long time basis, a consumer may be locked out for a very long period of time, in some cases as much as the remainder of the day.

Another existing solution is to penalize consumers for requests in excess of the permitted rate. Each consumer must implement error-handling code to recognize a return indicating it has been penalized, which might be different for each service consumed. Each consumer must monitor its own rate of usage to avoid penalties.

Yet another solution allows requests to be processed but charges additionally for them. The cost to the customer becomes unpredictable and potentially uncontrollable. In addition, providers may change their models from time to time, which in turn requires every consumer to potentially make code changes to accommodate.

The illustrative embodiments provide a general technique that allows the provider to automatically throttle the rate of response without rejecting requests, without penalizing overactive consumers, and without requiring special handling on the part of every consumer. The illustrative embodiments queue incoming service requests regardless of their rate of arrival. The queue is serviced using a first-in-first-out (FIFO) model at a fixed rate determined by the licensed rate (contract). Each consumer is allocated its own queue, independent of other consumers. The rate of request processing is defined independently for each queue (i.e., each consumer).

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
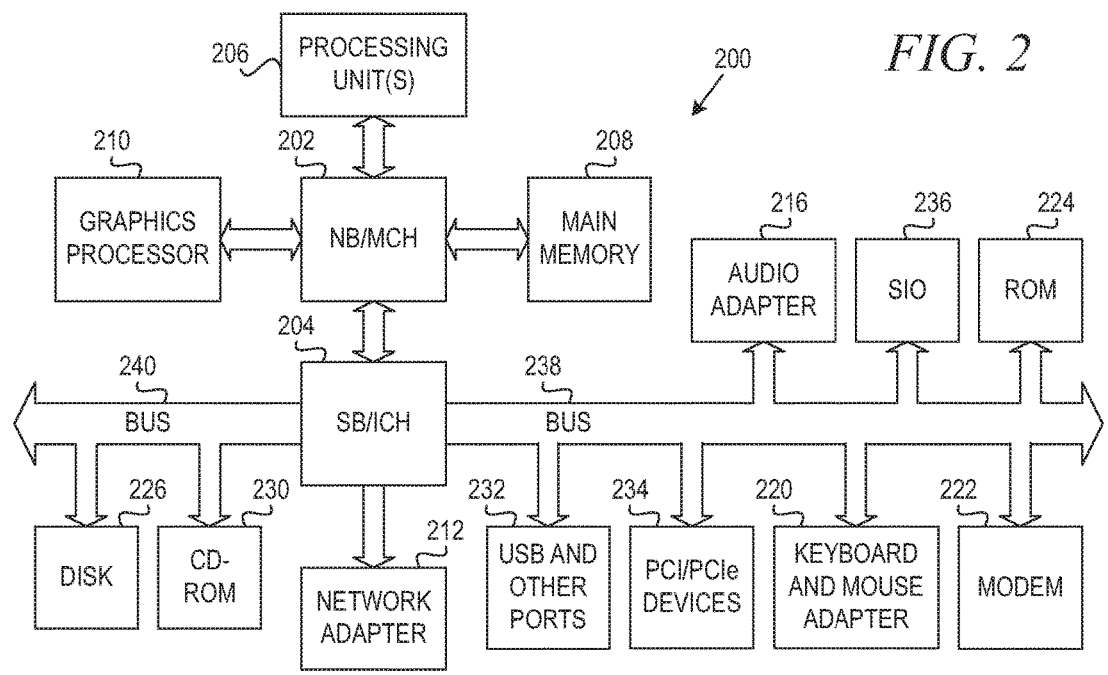
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a flow controller for automatically throttling the rate of service provided by a Web API. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates throttling the rate of service provided by Web APIs.

More particularly, clients 10, 112, 114 generate request for a Web API (not shown) for a software service executing on a server 104 or 106. Clients 110, 112, 114 may execute applications or apps that communicate with the Web API on server 104 or 106. Clients 110, 112, 114 are consumers of the service. The illustrative embodiments provide a flow controller that queues incoming service requests regardless of their rate of arrival. Each consumer is allocated its own queue independent of other consumers.

As noted above, the mechanisms of the illustrative embodiments utilize specifically configured computing devices, or data processing systems, to perform the operations for throttling rate of service provided by Web APIs. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a huh architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, Cd-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the flow controller for automatically throttling rate of service provided by a Web API.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
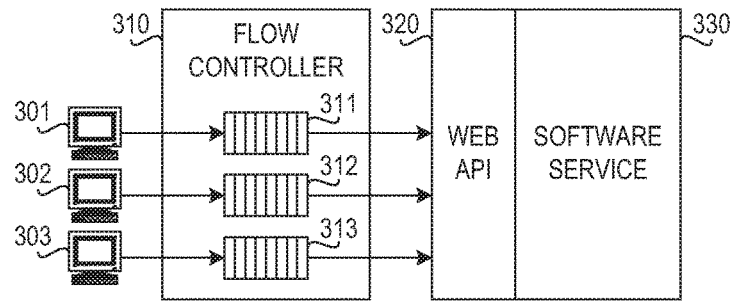
FIG. 3 is a block diagram illustrating a mechanism for automatically throttling the rate of service provided by a Web API in accordance with an illustrative embodiment.

FIG. 3 is a block diagram illustrating a mechanism for automatically throttling the rate of service provided by a Web API in accordance with an illustrative embodiment. Consumers 301, 302, 303 send requests to Web API 320 to access software service 330. Flow controller 310 receives the requests and queue them in queues 311, 312, 313. Flow controller 310 maintains a separate queue 311, 312, 313, which is a first-in-first-out (FIFO) queue, for each consumer 301, 302, 303 independent of other consumers.

Flow controller 310 adds (enqueues) each new request from consumer 301, for example, at the back of queue 311. Web API 320 retrieves requests from the front of queue 311. Flow controller 310 services each FIFO queue 311, 312, 313 at a fixed rate determined by the licensed rate (contract). In one embodiment, flow controller 310 includes logic that records and enforces the licensed rate for each consumer 301, 302, 303. Flow controller 310 may enforce the licensed rate by maintaining a timer for each consumer based on the licensed rate of that consumer. Flow controller 310 then notifies Web API 320 that a message (request) is ready in a given queue 311, 312, 313, provided a message exists in that queue.

Web API 320 retrieves requests from the queues 311, 312, 313 having available messages (requests) according to a predetermined scheme, such as first-come-first-served, round robin, random selection, an algorithm based on queue depth or other heuristic algorithm. In an alternative embodiment, Web API 320 may consult a timer to enforce the licensed rate of service rather than enforcing the rate of service at the flow controller. In another embodiment, flow controller 310 may be implemented within Web API 320. In yet another embodiment, flow controller 310 may be implemented in a proxy server.

Consumers of the service do not receive rejections (error codes) When the rate of submission is too high. Instead, the requests are added to the front of the queue, which grows and shrinks in response to changes in demand. Consumers are never penalized for excess request submissions. Instead, they simply experience increased wait times as an automatic consequence of the queue length and the fixed rate of processing. Each consumer's experience is independent of other consumers, as they each smit to their own queue. One consumer is not slowed by excessive submissions from another consumer. Each customer receives a dependable rate of service according to its subscription (contract). Customers do not receive overage charges, as they never exceed their licensed rate of service, which can be changed easily at any time by adjusting the processing rate of the queue.

Figure 4:
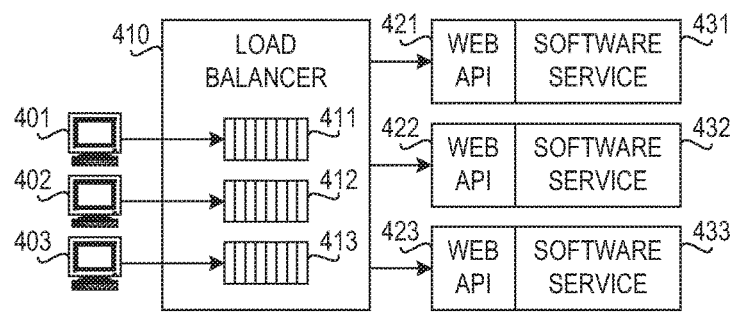
FIG. 4 is a block diagram illustrating a mechanism in a load balancer for automatically throttling the rate of service provided by a Web API in accordance with an illustrative embodiment.

FIG. 4 is a block diagram illustrating a mechanism in a load balancer for automatically throttling the rate of service provided by a Web API in accordance with an illustrative embodiment. Consumers 401, 402, 403 send requests to Web APIs 421, 422, 423 to access instances 431, 432, 433 of a software service. In the illustrative embodiment, the software service may be provided by a server cluster or a cloud computing system. In one embodiment, software service instances 431, 432, 433 may be implemented within virtual machine instances, which may be provisioned, de-provisioned, or migrated between physical systems in response to changes in demand. Load balancer 410 receives the requests and queue them in queues 411, 412, 413, Load balancer 410 maintains a separate queue 411, 412, 413, which is a first-in-first-out (FIFO) queue, for each consumer 401, 402, 403 independent of other consumers.

Load balancer 410 adds (enqueues) each new request from consumer 401, for example, at the back of queue 411. Load balancer 410 distributes requests from queues 411, 412, 413 among Web API instances 421, 422, 423. That is, load balancer 410 selects a Web API instance 421, 422, 423 according to a scheduling algorithm to optimize resource use, maximize throughput, minimize response time, and avoid overload of any single resource. Simple algorithms include random choice or round robin. More sophisticated load balancers may take additional factors into account, such as a server's reported load, least response times, up/down status (determined by a monitoring poll of some kind), number of active connections, geographic location, capabilities, or how much traffic it has recently been assigned.

Load balancer 410 services each FIFO queue 411, 412, 413 at a fixed rate determined by the licensed rate (contract). In one embodiment, load balancer 410 includes logic that records and enforces the licensed rate for each consumer 401, 402, 403. Load balancer 410 may enforce the licensed rate by maintaining a timer for each consumer based on the licensed rate of that consumer. Load balancer 410 then notifies a selected one of Web API instances 421, 422, 423 that a message (request) is ready in a given queue 411, 412, 413, provided a message exists in that queue. Having been notified of an available message in a given queue 411, 412, 413, a given Web API instance 421, 422, 423 retrieves requests from the given queue. In one embodiment, each Web API instance 421, 422, 423 retrieves and processes requests in the order they are made available.

Figure 5:
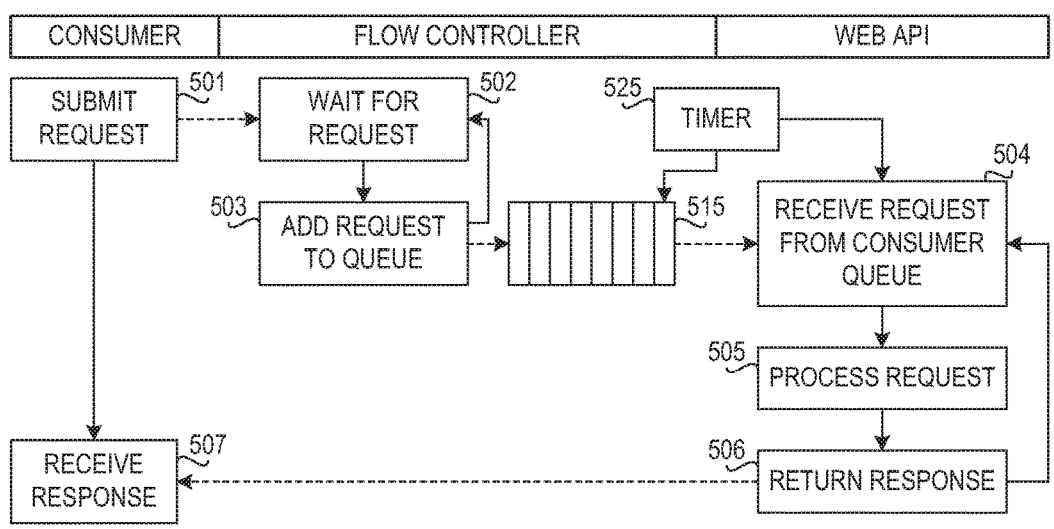
FIG. 5 depicts a detailed flow of a system for automatically throttling the rate of service provided by a Web API in accordance with an illustrative embodiment.

FIG. 5 depicts a detailed flow of a system for automatically throttling the rate of service provided by a Web API in accordance with an illustrative embodiment. In block 501, the consumer submits a request to the flow controller. In block 502, the flow controller waits for a request until a request is received from a consumer. In block 503, in response to receiving a request from the consumer, the flow controller adds the request to the queue 515, which is assigned to the consumer.

In one embodiment, the flow controller sets timer 525 based on the licensed rate of service of the consumer. In response to expiration of timer 525, the flow controller notifies the Web API that a message is available on queue 515. In block 504, the Web API receives the request from the consumer queue 515. The Web API processes the request in block 505 and returns the response to the consumer in block 506. The consumer receives the response in block 507.

In another embodiment, the Web API sets timer 525 based on the licensed rate of service of the consumer. In response to expiration of timer 525, the Web API receives the request from the consumer queue 515 in block 504. The Web API then processes the request in block 505 and returns the response to the consumer in block 506.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
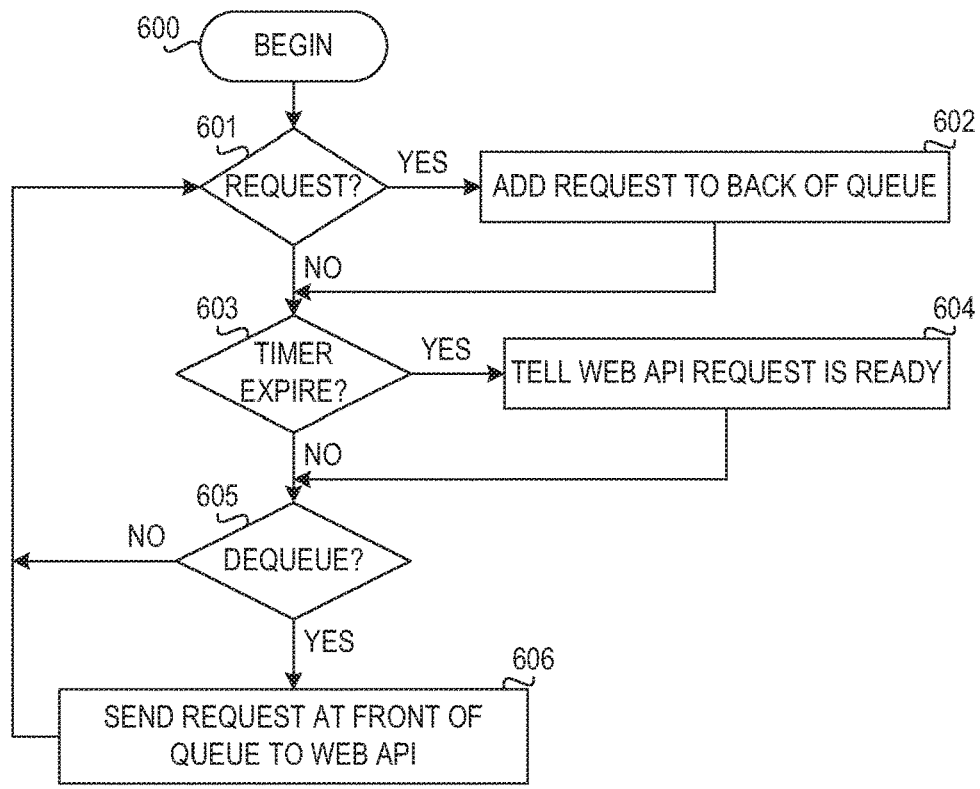
FIG. 6 is a flowchart illustrating operation of a flow controller for automatically throttling the rate of service provided by a Web API in accordance with an illustrative embodiment.

FIG. 6 is a flowchart illustrating operation of a flow controller for automatically throttling the rate of service provided by a Web API in accordance with an illustrative embodiment. Operation begins (block 600). The flow controller determines whether a request is received from a consumer (block 601). If the flow controller receives a request, the flow controller adds the request to the back of the queue assigned to the consumer (block 602).

Thereafter, or if the flow controller does not receive a request in block 601, the flow controller determines whether a timer associated with a queue expires (block 603). If a timer expires, the flow controller tells the Web API that a request is ready in the associated queue (block 604).

Thereafter, or if a timer does not expire in block 603, the flow controller determines whether a request is to be dequeued to a Web API (block 605). A request may be dequeued if the Web API retrieves a request from a queue in the flow controller. If a request is to be dequeued, the flow controller sends a request at the front of the queue to the Web API (block 606). Thereafter or if a request is not to be dequeued in block 605, operation returns to block 601 to determine whether a request is received from a consumer.

Figure 7:
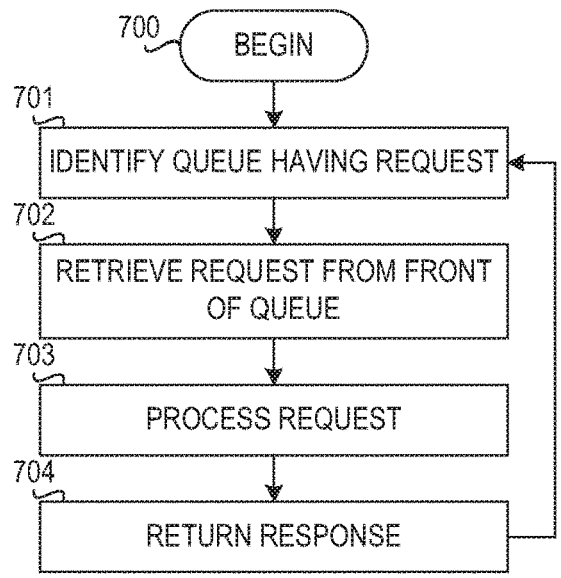
FIG. 7 is a flowchart illustrating operation of a Web API for automatically throttling the rate of service provided by a Web API in accordance with an illustrative embodiment.

FIG. 7 is a flowchart illustrating operation of a Web API for automatically throttling the rate of service provided by a Web API in accordance with an illustrative embodiment. Operation beings (block 700), and the Web API identifies a queue in the flow controller having a request (block 701). The Web API may identify a queue in the flow controller based on an order of notifications that a request is ready. Alternatively, the Web API may use a selection scheme, such as round robin, random selection, an algorithm based on queue depth, or another selection scheme.

The Web API retrieves a request from the front of the identified queue (block 702). The Web API processes the request (block 703) and returns a response to the consumer (block 704). Thereafter, operation returns to block 701 to identify a queue in the flow controller having a request.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. ModeMs, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automatically throttling a rate of service provided by a Web application programming interface (API) for a software service, the method comprising:
   assigning, by a flow controller executing on the data processing system, a queue to each consumer within a plurality of consumers of the software service resulting in a plurality of consumer queues;
   responsive to receiving a current request for the software service from a given consumer of the software service, adding, by the flow controller, the current request to a given queue within the plurality of consumer queues assigned to the given consumer; and
   sending, by the flow controller, a next request from the given queue to the Web API based on a licensed rate of service of the given consumer, wherein sending the next request based on the licensed rate of service comprises:
       setting, by the flow controller, a timer associated with the given queue based on the licensed rat of service of the given consumer; and
       responsive to expiration of the timer, notifying the Web API that a request is ready in the given queue.

2. The method claim 1, wherein the given queue is a first-in-first-out queue, wherein the flow controller adds the current request at a back of the given queue, and wherein the flow controller sends the next request from a front of the given queue.

3. The method of claim 1, wherein the Web API receives the next request, processes the next request, and returns a response to the given consumer.

4. The method of claim 3, wherein the Web API selects a queue, from the plurality of consumer queues in the flow controller, having a request available based on a predetermined scheme.

5. The method of claim 4, wherein the predetermined scheme comprises first-come-first-served, round robin, random selection, or an algorithm based on queue depth.

6. The method of claim 1, wherein the flow controller is implemented within a proxy server.

7. The method of claim 1, wherein the flow controller is implemented within a load balancer executing on the data processing system, wherein sending the next request comprises selecting an instance of the Web API from a plurality of instances of the Web API based on a scheduling algorithm, and wherein each instance of the Web API within the plurality of instances of the Web API is associated with an instance of the software service.

8. The method of claim 7, wherein the scheduling algorithm comprises random choice or round robin.

9. The method of claim 7, wherein the scheduling algorithm is based on a server's reported load, least response times, up/down status, number of active connections, geographic location, capabilities, or how much traffic each instance of the Web API has recently been assigned.

10. A computer program product comprising a non-transitory computer readable storage medium having a computer readable program stored therein, wherein the computer readable program, when executed on a computing device, causes the computing device to implement a flow controller for automatically throttling a rate of service provided by a Web application programming interface (API) for a software service, wherein executing the computer readable program causes the computing device to:
assign, by a flow controller executing on the data processing system, a queue to each consumer within a plurality of consumers of the software service resulting in a plurality of consumer queues;
responsive to receiving a current request for the software service from a given consumer of the software service, add, by the flow controller, the current request to a given queue assigned to the given consumer; and
send, by the flow controller, a next request from the given queue to the Web API based on a licensed rate of service of the given consumer, wherein sending the next request based on the licensed rate of service comprises:
setting, by the flow controller, a timer associated with the given queue based on the licensed rate of service of the given consumer; and
responsive to expiration of the timer, notifying the Web API that a request is ready in the given queue.

11. The computer program product of claim 10, wherein the given queue is a first-in-first-out queue, wherein the flow controller adds the current request at a back of the given queue, and wherein the flow controller sends the next request from a front of the given queue.

12. The computer program product of claim 10, wherein the Web API receives the next request, processes the next request, and returns a response to the given consumer.

13. The computer program product of claim 12, wherein the Web API selects a queue, from the plurality of consumer queues in the flow controller, having a request available based on a predetermined scheme.

14. The computer program product of claim 10, wherein the flow controller is implemented within a proxy server.

15. The computer program product of claim 10, wherein the flow controller is implemented within a load balancer executing on the data processing system, wherein sending the next request comprises selecting an instance of the Web API: from a plurality of instances of the Web API based on a scheduling algorithm, and wherein each instance of the Web API within the plurality of instances of the Web API is associated with an instance of the software service.

16. An apparatus comprising:
a processor; and
a memory coupled to the processor, wherein the memory comprises instructions which, when executed by the processor, cause the processor to implement a flow controller for automatically throttling a rate of service provided by a Web application programming interface (API) for a software service, wherein executing the instructions causes the processor to:
assign, by a flow controller executing on the data processing system, a queue to each consumer within a plurality of consumers of the software service resulting in a plurality of consumer queues;
responsive to receiving a current request for the software service from a given consumer of the software service, add, by the flow controller, the current request to a given queue assigned to the given consumer; and
send, by the flow controller, a next request from the given queue to the Web API based on a licensed rate of service of the given consumer, wherein sending the next request based on the licensed rate of service comprises:
setting, by the flow controller, a timer associated with the given queue based on the licensed rate of service of den consumer; and
responsive to expiration of the timer, notifying the Web API that a request is ready in the given queue.

17. The apparatus of claim 16, wherein the given queue is a first-in-first-out queue, wherein the flow controller adds the current request at a back of the given queue, and wherein the flow controller sends the next request from a front of the given queue.

18. The apparatus of claim 16, wherein the flow controller is implemented within a load balancer executing on the data processing system, wherein sending the next request comprises selecting an instance of the Web API from a plurality of instances of the Web API based on a scheduling algorithm, and wherein each instance of the Web API within the plurality of instances of the Web API is associated with an instance of the software service.

19. The apparatus of claim 16, wherein the Web API receives the next request, processes the next request, and returns a response to the given consumer.

20. The apparatus of claim 19, wherein the Web API selects a queue, from the plurality of consumer queues in the flow controller, having a request available based on a predetermined scheme.

* * * * *